Feb. 8, 1972    R. T. LA FLAIR ET AL    3,641,205
RUBBERY POLYMERIC BLENDS

Filed March 25, 1968    2 Sheets-Sheet 1

RONALD TURNER LaFLAIR
JOHN FREDERICK HENDERSON
INVENTOR

BY Robert G. Hwin
ATTORNEY

United States Patent Office 3,641,205
Patented Feb. 8, 1972

3,641,205
RUBBERY POLYMERIC BLENDS
Ronald Turner La Flair and John Frederick Henderson, Sarnia, Ontario, Canada, assignors to Polymer Corporation Limited, Sarnia, Ontario, Canada
Filed Mar. 25, 1968, Ser. No. 715,630
Claims priority, application Canada, Apr. 1, 1967, 986,798, 986,799
Int. Cl. C08f 33/08, 41/12
U.S. Cl. 260—876 B
6 Claims

ABSTRACT OF THE DISCLOSURE

The physical properties of thermoplastic rubbery block copolymers, especially at elevated temperatures, are improved by adding minor amounts of a partially compatible synthetic resin having a softening point higher than that of the thermoplastic blocks of the block copolymer, e.g. polyacenaphthylene or polyalphamethylstyrene.

---

Figure 1:
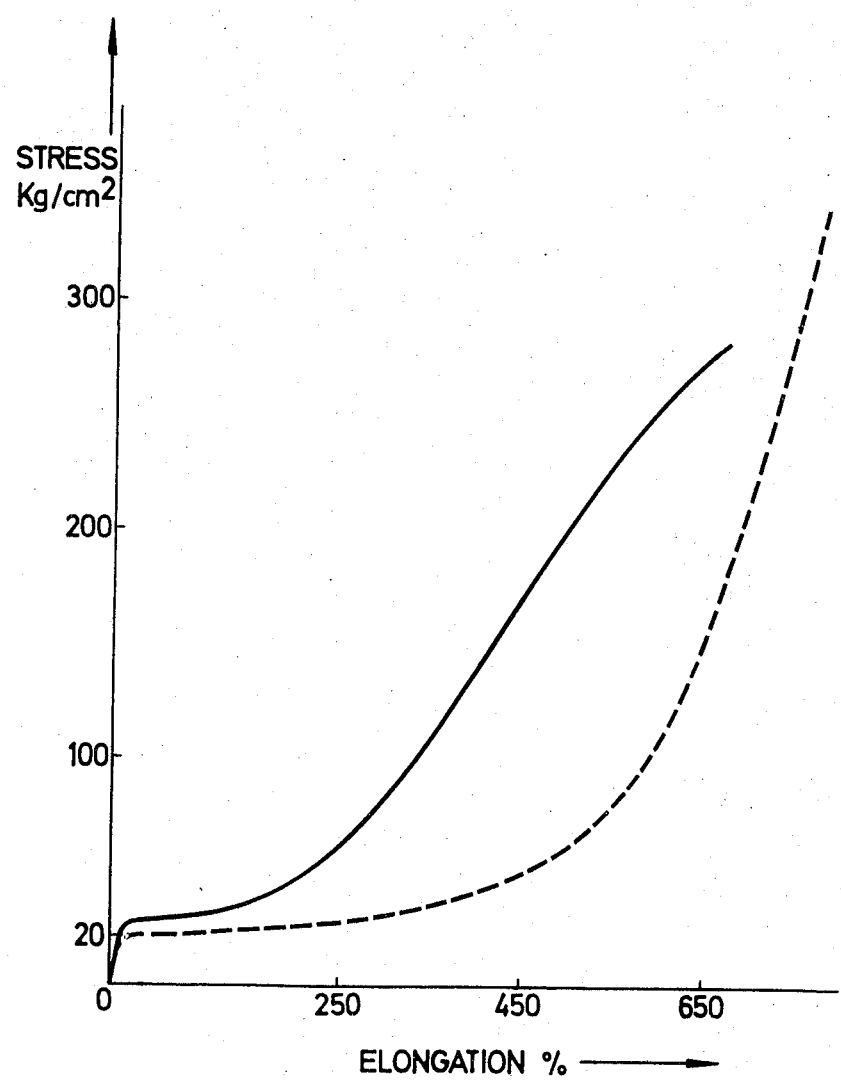

This invention relates to novel thermoplastic rubbers and to methods of improving the properties of thermoplastic rubbers.

A thermoplastic rubber is a material which exhibits the properties of both a thermoplastic material and a rubber material. On heating the material softens and eventually flows, so that it can be molded as a conventional thermoplastic material. At room temperature the material behaves as a rubber, being stretchable to at least twice its normal length, and returning with force to its original length in a short time on release.

Well known thermoplastic rubbers are block copolymers comprising terminal non-elastomeric polymer blocks such as polystyrene blocks and at least one non-terminal elastomeric polymer block such as a polybutadiene or polyisoprene block. They exhibit rubbery properties without vulcanization. Thus, 3-block copolymers of general form polystyrene-polybutadiene-polystyrene are known, as thermoplastic rubbers. 5-block copolymers of form polystyrene - polybutadiene - polystyrene-polybutadiene-polystyrene are similar thermoplastic rubbers. They may be prepared by a step-wise polymerization procedure using an anionic polymerization initiator such as an organo-lithium compound, in solution. Styrene is first completely polymerized under substantially anhydrous and oxygen-free conditions, and without deactivating the polymer, butadiene is added, to polymerize onto the end of the polystyrene and form the centre block. After complete polymerization of the butadiene and without deactivating the polymer, a further styrene charge is added, which polymerizes to form the end block. If the polymer is then deactivated and extracted, a 3-block copolymer results. Further increments of monomer may be added before deactivation, to add further blocks to the copolymer.

One variation in this procedure is a coupling procedure, in which after complete polymerization of the butadiene, a reagent such as carbon dioxide is added, which effects coupling of the polymer molecules through their active ends, i.e. the butadiene ends. A 3-block copolymer is thereby formed, of essentially the same structure as that produced by the step-wise procedure. Another variation is to add the butadiene before complete polymerization of the styrene forming the first block, to obtain a random butadiene/styrene elastomeric copolymer as centre block. Further addition of styrene will form a terminal polystyrene block. Such "overlap" block copolymers are also thermoplastic rubbers.

These thermoplastic rubbers have certain disadvantages. One is their deterioration in physical properties at elevated temperatures. In the region of 60–80° C. the tensile strength of these materials is so low that the materials are of little practical use where they must withstand stress at such temperatures, for example as insulation for high-voltage electric cable, and in soles for washable canvass-upper shoes.

A second disadvantage is that these materials yield at a certain elongating stress. When a stress is applied, the materials elongate substantially in proportion to the stress when small stresses are applied, and on release the materials rapidly recover their original length. However, at a certain stress value, the polymer yields, a small increase in stress over a certain value causing a large elongation, and the material only recovers slowly on release due to its very small restoring force. This is in contrast to normal rubbers, which exhibit strong restoring forces at all stages of elongation up to their breaking point.

It is an object of the present invention to provide thermoplastic rubbery materials with improved elevated temperature properties, and in which the yielding phenomenon is less marked or even eliminated.

According to the present invention, there is provided a polymeric blend comprising a block copolymer having terminal non-elastomeric polymeric blocks and at least one non-terminal elastomeric polymeric block, and a polymer having a higher glass transition temperature than, and only partial compatibility with, the polymers constituting the non-elastomeric blocks of the block copolymer.

The requirement that the polymer have only partial compatibility with the non-elastomeric portions of the block copolymer is important in achieving the objects of this invention. The effect of highly compatible polymers in blends with thermoplastic rubbery block copolymers is to increase the stiffness and to reduce the rubberiness of the composition, which is undesirable. On the other hand, highly incompatible materials do not give the desired increase in elevated temperature properties.

For use with the well known styrene containing block copolymeric thermoplastic rubbers, suitable polymers for preparation of the blends of the present invention include polymers of acenaphthylene, polymers of an alpha-alkyl-vinyl substituted aromatic compound such as alpha-methylstyrene, polyphenylene oxide, styrene-acrylonitrile copolymers, styrene-methyl methacrylate copolymers and mixtures thereof. Of these polymers, the preferred are polyacenaphthylene, high molecular weight polyalpha-methylstyrene and high molecular weight styrene-alpha-methylstyrene block copolymers, with polyacenaphthylene being especially preferred, since smaller amounts of polyacenaphthylene are required to achieve the desired results.

The polymer of acenaphthylene may be a copolymer, for example of acenaphthylene and styrene, but is most suitably homopolymeric acenaphthylene. The polymer is conveniently of sufficiently high molecular weight to be solid at room temperature, i.e. about 10,000 or higher.

Methods of preparing homopolymers of acenaphthylene are known per se and do not comprise part of the present invention. One method is by cationic polymerization in solution. Acenaphthylene is dissolved in ether at —50° C., and the solution is treated briefly with a slow stream of boron-trifluoride gas. The solution is then allowed to warm to 25° C. After polymerization at this temperature, the polymer precipitates and may be removed by filtration. An alternative method is by free radical polymerization, the monomer being dissolved in benzene and benzoyl peroxide being used as a polymerization initiator.

Figure 2:
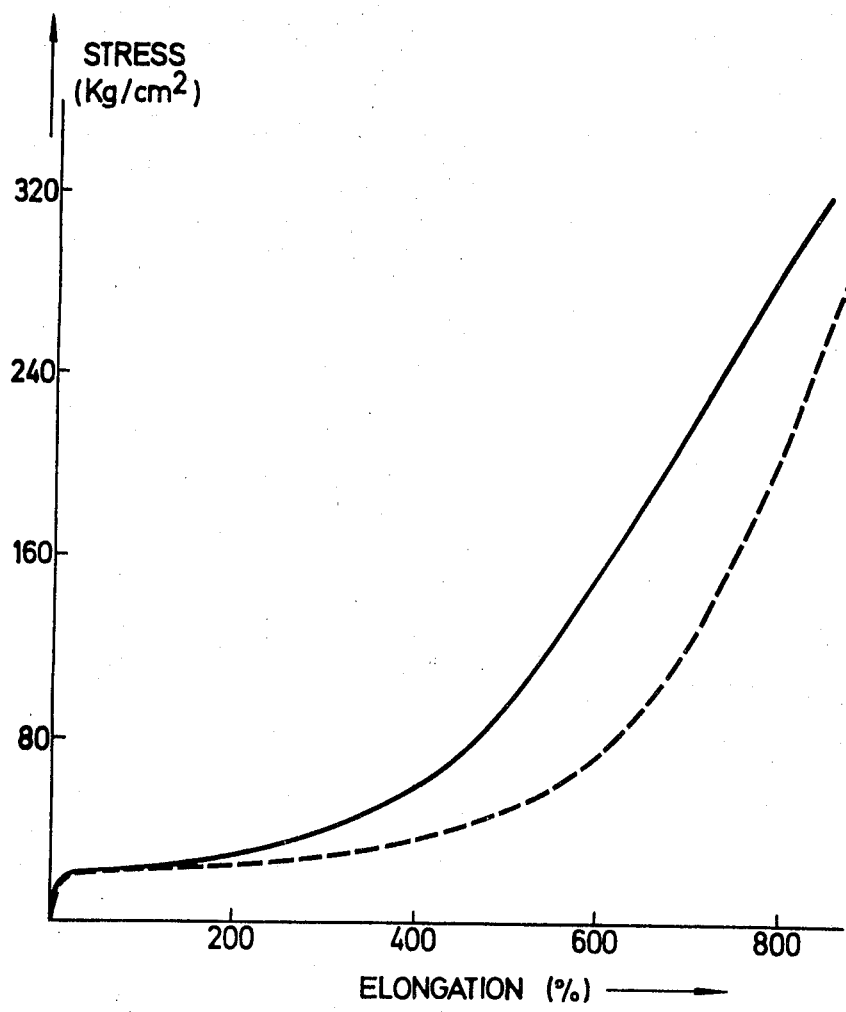

In the drawings:

FIG. 1 represents the stress-strain curve of a polymeric blend according to the invention, and more particularly described in the following Example 1, along with the stress-strain curve of a block copolymer control; FIG. 2 block is the stress-strain curve of a further polymeric blend according to the invention and more particularly described in the following Example 5, and the stress-strain curve of a block copolymer control.

The alpha-alkyl-vinyl substituted aromatic compounds include alphamethylstyrene, and its similar homologues such as alpha-ethyl-styrene and alpha-methyl-vinyl toluene. The preferred compound is alphamethylstyrene, which is readily available.

The polymer of alphamethylstyrene may be a homopolymer or a copolymer. Of copolymers, particularly suitable are block copolymers comprising one or more homopolymeric blocks of alphamethylstyrene and one or more homopolymeric blocks of styrene. The polymer is of alphamethylstyrene should be of sufficiently high molecular weight to be solid at room temperature i.e. at least 5,000, and preferably at least 100,000.

Methods of preparing homopolymers of alphamethylstyrene are well known per se, and do not comprise part of the present invention. They include use of a cationic catalyst, for example aluminum trichloride, in solution in a polar organic solvent, for example ethylchloride, at temperatures below 0° C. An alternative is the use of an anionic catalyst, for example metallic potassium or metallic lithium, in a bulk system, at a temperature of about 15° C. It is essential in all polymerizations of alphamethylstyrene that the monomer should have a high degree of purity, otherwise polymers of high molecular weight will not be formed.

Block copolymers of alphamethylstyrene and styrene may be prepared by a step-wise addition procedure using an anionic polymerization initiator, such as butyl-lithium. Polymerization is best carried out in a polar solvent at a temperature below 0° C. when preparing a 2-block copolymer, either monomer may be polymerized first. A suitable solvent is a mixture of benzene and tetrahydrofuran. The second monomer is added after complete polymerization of the first monomer. The temperature should be about −8° C.

The method by which the blends of the present invention are formed is not critical, provided that an intimate dispersion of the two materials on a micro-scale is achieved. The preferred method is by mixing solutions of the two polymeric materials, and then co-precipitating the materials from the solution. However, dry mixing on a mill can also be used, provided the mill rolls are adequately heated.

The block copolymer should in general constitute at least half of the weight of the final blended composition. Significant improvements in the properties of the thermoplastic rubbers can however be achieved on the addition of as little as 5 parts by weight of polymer to 100 parts by weight of block copolymer. The preferred proportions are from 10–80 parts by weight of polymer per 100 parts by weight of block copolymer.

Any of the block copolymers previously mentioned as comprising thermoplastic rubbers are suitable for use in the present invention. Suitably, the elastomeric polymeric block is a polymer of a conjugated diolefinic hydrocarbon. 3-block and 5-block copolymers of styrene and butadiene or isoprene are preferred. They preferably have a styrene content of from 10–60 weight percent and a molecular weight of approximately 20,000 to 150,000.

The invention will be further described with reference to specific examples.

EXAMPLE 1

In this example, a 3-block copolymer of general form polystyrene-polybutadiene-polystyrene was blended with different minor amounts of a homopolymer of alphamethylstyrene, and the resulting blends tested at room temperature and elevated temperatures.

The styrene-butadiene block copolymer had an intrinsic viscosity of 0.927, which corresponds to an approximate molecular weight of 110,000, and a styrene content of 33.4 weight percent. It was prepared by the step-wise addition procedure.

The polyalphamethylstyrene had an intrinsic viscosity of 2.06, which corresponds to an approximate molecular weight of 1,100,000. It was prepared by anionic polymerization at −8° C. in a mixture of benzene and tetrahydrofuran as solvent.

The polymeric materials were blended by dissolving known concentrations of the two polymers in benzene, and co-precipitating them in excess ethanol. The resulting blend was separated from the solvent, dried, pressed into sheets, and subjected to physical tests. For testing purposes micro-dumbbells of thickness 0.6 mm. and width 2.4 mm. were cut from the dried polymer sheets and subjected to strength tests.

A series of blends of different proportions of each polymeric material was prepared and tested. The composition of these blends, and the results of the tests, are given in Table 1. The tensile strength and 100% moduli of these blends, reported in kilograms per square centimetre, were measured by the standard procedure using an Instron Tester both at room temperature of about 25° C., and at 80° C. The figures at 80° C. were obtained by testing a sample in an air chamber maintained at 80° C. The trouser-tear test was carried out using an Instron Tester, as in the tensile strength test. A sheet of the material 50 by 25 mm. and 0.6 mm. thick was prepared and cut from midway on one side to the centre. The strips either side of the cut were gripped one in each jaw of the Instron Tester. The force required to tear the sheet was then measured, and expressed in kilograms per centimetre thickness, in the table.

TABLE 1

| Blend | A | B | C | D | E | F |
|---|---|---|---|---|---|---|
| Block copolymer, parts by wt. | 100 | 100 | 100 | 100 | 100 | 100 |
| Polyalphamethylstyrene, parts by wt. | 0 | 17.1 | 24.3 | 33.3 | 42.8 | 53.5 |
| Tensile strength at: | | | | | | |
| 25° C | 338.8 | 359.8 | 269.2 | 247.6 | 185.0 | 183.9 |
| 80° C | 13.4 | 17.0 | 18.1 | 25.1 | 26.2 | 41.6 |
| 100% modulus at: | | | | | | |
| 25° C | 22.3 | 30.6 | 35.2 | 44.2 | 60.4 | 94.3 |
| 80° C | 14.8 | 17.0 | 17.9 | 24.6 | 25.8 | 41.6 |
| Trouser tear test | 22.9 | 28.4 | 27.8 | 24.9 | 43.9 | 30.8 |

The above results show that the blends of the present invention have marked increases in tensile strength and 100% modulus at elevated temperatures as compared with the block copolymer itself.

Reference is now made to accompanying FIG. 1, which shows the stress-strain curve of a blend of the present invention, and the corresponding stress-strain curve of a styrene-butadiene three-block copolymer.

On this figure, the y-axis represents the stress, in kilograms/sq. cm., applied to the sample, and the x-axis represents the elongation. The full-line curve is that obtained from Blend D detailed previously in Example 1. The broken curve is that of the three-block styrene-butadiene block copolymer used in preparing the blends of Example 1.

It will be seen from this figure that the broken curve has substantially horizontal portion, corresponding to an applied stress of about 20 kg./sq. cm. The elongation of this block copolymer thus increases about 400% on increasing the applied stress from 20 to 40 kg./sq. cm. This shows that the polymer yields at this stress of 20 kg./sq. cm., and so its restoring forces in this region are very small, unlike a conventional rubber.

On the other hand, the full-line curve has a steeper gradient over this portion, and does not have a sizeable, substantially horizontal portion, indicating that the blend has a much less pronounced yielding phenomenon, making it more rubber-like than the styrene-butadiene block copolymer.

EXAMPLE 2

In this example, a block copolymer of general form polystyrene-polybutadiene-polystyrene, of approximate molecular weight 110,000 and styrene content 33.3 weight percent, was blended with different amounts of a homopolymer of alphamethylstyrene, of approximate molecular weight 800,000.

The blends were prepared and tested as described in Example 1. The results are given in Table 2.

TABLE 2

| Blend | G | H | I | J |
|---|---|---|---|---|
| Block copolymer, parts by wt | 100 | 100 | 100 | 100 |
| Polyalphamethylstyrene, parts by wt | 0 | 20 | 30 | 40 |
| Tensile strength at: | | | | |
| 25° C | 289.1 | 226.9 | 175.3 | 167.3 |
| 80° C | 13.8 | 17.7 | 22.1 | 32.1 |
| 100% modulus at: | | | | |
| 25° C | 30.5 | 36.6 | 50.2 | 64.9 |
| 80° C | 15.5 | 17.7 | 22.1 | 32.1 |
| Trouser tear test | 33.1 | 44.4 | 61.4 | 65.0 |

EXAMPLE 3

In this example, a 3-block copolymer of general form polystyrene-polybutadiene-polystyrene, of approximate molecular weight 125,000 and styrene content 32.6 weight percent was blended different amounts of a 2-block copolymer of form polystyrene-polyalphamethylstyrene. The 2-block copolymer had an alphamethylstyrene content of 65 weight percent and an intrinsic viscosity ($\eta$) of 0.638 as measured in toluene at 30° C. It was prepared using a step-wise polymerization procedure at −8° C. in a mixture of benzene and tetrahydrofuran as solvent, and butyllithium as initiator. Styrene was added first, and after complete polymerization of the styrene, carefully purified alphamethylstyrene was added. After complete polymerization of the alphamethylstyrene, the polymer was recovered.

The blends were prepared and tested as described in Example 1. The results are given in Table 3.

TABLE 3

| Blend | K | L | M | N | O |
|---|---|---|---|---|---|
| Block copolymer, parts by wt | 100 | 100 | 100 | 100 | 100 |
| Alphamethylstyrene polymer, parts by wt | 0 | 10 | 20 | 30 | 40 |
| Tensile strength at: | | | | | |
| 25° C | 335 | 338.4 | 334.8 | 263.0 | 242.3 |
| 80° C | 11.6 | 21.7 | 24.8 | 27.2 | 28.9 |
| 100% modulus at: | | | | | |
| 25° C | 23.5 | 26.8 | 31.0 | 36.6 | 43.6 |
| 80° C | 14.7 | 17.1 | 19.8 | 22.7 | 24.5 |

EXAMPLE 4

In this example, a 3-block copolymer of general form polystyrene-polybutadiene-polystyrene, was blended with a 2-block copolymer of general form polystyrene-polyalphamethylstyrene.

The 3-block copolymer had an approximate molecular weight of 125,000 and a styrene content of 32.6 weight percent. It was prepared by a step-wise addition procedure.

The styrene-alphamethylstyrene block copolymer had an intrinsic viscosity ($\eta$) of 0.725 as measured in toluene at 30° C., and an alphamethylstyrene content of 36 weight percent. It was prepared by a step-wise addition procedure at −8° C., using as solvent a mixture of benzene and tetrahydrofuran, and as initiator butyllithium. Alphamethylstyrene was added first, and styrene was added after complete polymerization of the alphamethylstyrene.

The blends were prepared and tested as described in Example 1. The results are given in Table 4.

TABLE 4

| Blend | P | Q | R | S | T |
|---|---|---|---|---|---|
| Block copolymer, parts by wt | 100 | 100 | 100 | 100 | 100 |
| Alphamethylstyrene polymer, parts by wt | 0 | 10 | 20 | 30 | 40 |
| Tensile strength at: | | | | | |
| 25° C | 335 | 291.1 | 319.4 | 277.5 | 272.9 |
| 80° C | 11.6 | 21.4 | 24.9 | 28.2 | 32.4 |
| 100% modulus at: | | | | | |
| 25° C | 23.5 | 31.0 | 32.6 | 36.6 | 54.2 |
| 80° C | 14.7 | 17.5 | 19.3 | 22.8 | 29.2 |

EXAMPLE 5

In this example a 3-block copolymer of general form polystyrene-polybutadiene-polystyrene was blended with different amounts of a homopolymer of acenaphthylene, and the resulting blends were tested at room temperature and elevated temperatures.

The styrene-butadiene block copolymer had an intrinsic viscosity of 0.944 which corresponds to an approximate molecular weight of 115,000, and a styrene content of 32.6 weight percent. It was prepared by a step-wise addition procedure.

The polyacenaphthylene had an intrinsic viscosity of 0.054, which corresponds to an approximately molecular weight of 25,000. It was prepared by cationic polymerization, in chlorobenzene using boron trifluoride as initiator.

The polymeric materials were blended by mixing solutions of known concentrations of the polymers in benzene, and co-precipitating them by addition of excess ethanol. The resulting blend was separated from the solvent, dried, pressed into sheets, and subjected to physical tests. For testing purposes micro-dumbbells of thickness of 0.6 mm. and width 2.4 mm. were cut from the dried polymer sheets and subjected to strength tests.

A series of blends of different proportions of each polymeric material was prepared and tested. The composition of these blends, and the results of the tests, are given in Table 5. The tensile strength and 100% moduli of these blends, reported in kilograms per square centimetre, were measured by the standard procedure using an Instron Tester both at room temperature of about 25° C., and at 80° C. The figures at 80° C. were obtained by testing a sample in a heated air chamber maintained at 80° C.

TABLE 5

| Blend | A | B | C | D | E | F | G | H |
|---|---|---|---|---|---|---|---|---|
| Block copolymer, parts by wt | 100 | 100 | 100 | 100 | 100 | 100 | 100 | 100 |
| Polyacenaphthylene, parts by wt | 0 | 5 | 10 | 20 | 40 | 60 | 80 | 100 |
| Tensile strength at: | | | | | | | | |
| 25° C | 314.3 | 317.5 | 281.6 | 323.3 | 269.1 | 222.2 | 213.4 | 178.5 |
| 80° C | 10.2 | 15.0 | 18.1 | 22.5 | 34.8 | 49.5 | 55.9 | 61.4 |
| Elongation at break at: | | | | | | | | |
| 25° C | 880 | 1200 | 940 | 840 | 835 | 705 | 595 | 500 |
| 80° C | 615 | 620 | 610 | 620 | 590 | 500 | 315 | 50 |
| 100% modulus at: | | | | | | | | |
| 25° C | 20.1 | 21.8 | 23.2 | 24.2 | 32.8 | 47.3 | 72.0 | 81.1 |
| 80° C | 12.3 | 13.7 | 13.6 | 15.1 | 20.6 | 31.1 | 44.1 | |

The above results show that the blends of the present invention have marked increases in tensile strength and extension modulus at elevated temperatures, whilst their elongations at break remain satisfactory for elastomers at room temperatures and elevated temperatures, with the exception of blend H, where at 80° C. the elongation at break is only 50%.

FIG. 2 shows the stress-strain curve prepared from blend D in Table 5 and was prepared from the block copolymer test designated A in Table 5. On this figure the y-axis represents the stress in kilograms/sq. cm. applied to the sample, and the x-axis represents the elongation. The full line curve is that obtained from blend. D. The broken curve is that of the 3-block styrene-butadiene copolymer designated A.

It will be seen from this figure that the broken curve lies below the full line curve, and has a long, very gradually rising portion between elongations of about 20% and about 500%. The curve shows that an increase in stress of only about 30 kg./sq. cm. is required to cause this increase in elongation. Thus this portion the polymer yields and has only very small restoring forces. This is in contrast to a normal rubber and is a deviation from what might be termed normal rubbery properties.

The full line curve, however, is steeper than the broken line curve, showing that the phenomenon of yielding is less marked in the blend, and that the properties of the blends are more rubber-like than those of the block copolymers themselves.

What is claimed is:

1. A polymeric blend comprising 100 parts by weight of a block copolymer having terminal blocks of polystyrene and a non-terminal elastomeric polymeric block of polybutadiene, polyisoprene or styrene-butadiene copolymer, and from 5-100 parts by weight of a polymer which has a higher glass transition temperature than, and is only partially compatible with, polystyrene, said polymer being selected from the group consisting of polyacenaphthylene, high molecular weight polyalphamethylstyrene and styrene-alphamethylstyrene block copolymers.

2. The blend of claim 1, wherein the polymer is homopolymeric polyacenaphthylene having a molecular weight higher than 10,000.

3. The blend of claim 1, wherein the polymer is high molecular weight polyalphamethylstyrene having a molecular weight of at least 100,000.

4. The blend of claim 1, wherein the polymer is a block copolymer of alphamethylstyrene and styrene.

5. The blend of claim 1, wherein the block copolymer is a 3-block copolymer having two terminal blocks of polystyrene and a centre block of polybutadiene or polyisoprene, said block copolymer having a styrene content of from 10-60 weight percent and a molecular weight of from 20,000 to 150,000.

6. The blend of claim 5 wherein the block copolymer comprises 100 parts by weight of the blend and the polymer comprises 10-80 parts by weight of the blend.

References Cited

UNITED STATES PATENTS

| | | | |
|---|---|---|---|
| 3,445,543 | 5/1969 | Gruver | 260—876 B |
| 3,459,831 | 8/1969 | Luftglass et al. | 260—876 B |
| 3,485,894 | 12/1969 | Porter | 260—876 B |
| 3,497,572 | 2/1970 | Childers et al. | 260—876 B |

FOREIGN PATENTS

| | | | |
|---|---|---|---|
| 1,127,820 | 9/1968 | Great Britain | 260—876 B |

MURRAY TILLMAN, Primary Examiner

H. ROBERTS, Assistant Examiner

U.S. Cl. X.R.

260—886 B, 886